United States Patent
Lindskog et al.

(10) Patent No.: US 7,039,016 B1
(45) Date of Patent: May 2, 2006

(54) CALIBRATION OF WIDEBAND RADIOS AND ANTENNAS USING A NARROWBAND CHANNEL

(75) Inventors: Erik D. Lindskog, Sunnyvale, CA (US); Mitchell D. Trott, Mountain View, CA (US)

(73) Assignee: ArrayComm, LLC, San Jose, CA (US)

( * ) Notice: Subject to any disclaimer, the term of this patent is extended or adjusted under 35 U.S.C. 154(b) by 1028 days.

(21) Appl. No.: 09/967,127

(22) Filed: Sep. 28, 2001

(51) Int. Cl.
*H04Q 7/34* (2006.01)

(52) U.S. Cl. ............... 370/252; 455/67.11; 455/115.2

(58) Field of Classification Search ............. 370/252; 455/501, 63.1, 67.11, 67.14, 115.2
See application file for complete search history.

(56) References Cited

U.S. PATENT DOCUMENTS

| | | | |
|---|---|---|---|
| 4,750,147 A | 6/1988 | Roy, III et al. | 364/807 |
| 4,965,732 A | 10/1990 | Roy, III et al. | 364/460 |
| 5,274,844 A | 12/1993 | Harrison et al. | 455/25 |
| 5,530,449 A | 6/1996 | Wachs et al. | 342/174 |
| 5,546,090 A | 8/1996 | Roy, III et al. | 342/174 |
| 5,642,353 A | 6/1997 | Roy, III et al. | 370/329 |
| 5,828,658 A | 10/1998 | Otersten et al. | 370/310 |
| 5,930,243 A | 7/1999 | Parish et al. | 370/334 |
| 6,037,898 A | 3/2000 | Parish et al. | 342/174 |
| 6,570,527 B1 * | 5/2003 | Lindskog et al. | 342/174 |
| 6,747,594 B1 * | 6/2004 | Lindskog et al. | 342/174 |
| 6,788,948 B1 * | 9/2004 | Lindskog et al. | 455/504 |

FOREIGN PATENT DOCUMENTS

| WO | WO99/40689 | 8/1999 |
|---|---|---|
| WO | WO99/57820 | 11/1999 |

* cited by examiner

*Primary Examiner*—Melvin Marcelo
(74) *Attorney, Agent, or Firm*—Blakely Sokoloff Taylor & Zafmann LLP

(57) ABSTRACT

A method and apparatus are provided that calibrate a wideband radio communications system without causing significant interference with simultaneous users of the system. In one embodiment, the invention includes an antenna array adapted to transmit and receive radio communications signals with a plurality of other terminals the communications signals each using a particular minimum bandwidth. A transmit chain transmits a calibration signal through the antenna array to a transponder, and a receive chain receives through the antenna array a transponder signal from the transponder, the transponder signal being based on the calibration signal and having a bandwidth narrower than the minimum bandwidth. A signal processor measures characteristics of the transponder signal as received through the receive chain. These can be used to determine spatial signatures and to calibrate the transmit chain and the receive chain.

43 Claims, 4 Drawing Sheets

CALIBRATION OF WIDEBAND RADIOS AND ANTENNAS USING A NARROWBAND CHANNEL

BACKGROUND OF THE INVENTION

1. Field of the Invention

The invention relates generally to the field of digital signal communications and to receive and transmit chain calibration. More particularly, the invention relates to calibrating a wideband or spread spectrum communications system using narrowband signals.

2. Description of the Related Art

Radio communications capacity can be greatly increased using directional, rather than omnidirectional radio transmission. One way to transmit directional signals and directionally receive signals is by using beam forming and nulling through an array of antennas. The precision of the beam forming and nulling through an antenna array, can be improved if the transmit and receive chains are both calibrated. Calibration can be applied to the chain from the digital interface at baseband to the field radiated from or received at each antenna element. One way of making the calibration is to have a transponder separated from the antenna array listen to the output of the antenna array on a base station downlink frequency. The transponder receives a downlink calibration signal from the base station and then re-transmits it on an uplink frequency. By selecting appropriate signals to transmit and appropriate signals to receive, the base station can apply signal processing to estimate compensations in phase and amplitude to calibrate its transmit and receive chains.

A remote transponder calibration system is shown, for example, in U.S. Pat. No. 5,546,090 to Roy, III et al. That patent describes a narrowband FDD (frequency division duplex) system. In an FDD system, unused time and frequency slots typically occur on occasion and these can be used to send and receive a narrowband calibration signal. In a typical spread spectrum system, however, there are no unused time and frequency slots to use for calibration. A spread spectrum system, for example a CDMA (code division multiple access) system, as opposed to FDMA (frequency division multiple access) and TDMA (time division multiple access) systems, has multiple users using the same radio channel at the same time. If the transponder is designed to receive and transmit the signal using the same spread spectrum channel that is used for traffic, then the additional energy added to the channel by calibration will reduce system capacity. A typical transponder will receive all of the downlink traffic including the calibration signal, shift the frequency, amplify it and send all of the traffic back to the base station. This results in a very large amount of energy being sent by the transponder on the uplink and may effectively overpower all other traffic. As a result, calibration will affect both the downlink and uplink channel capacity.

The interference can be reduced by turning off all normal downlink signals when calibration is being performed and sending a special low interference calibration downlink signal. However, in addition to interrupting the downlink traffic, this approach will still cause interference on the uplink. The interference can also be reduced if the transponder is constructed to despread the calibration signal to isolate it from all other traffic and then send back only a spreaded, frequency shifted version of that despread calibration signal. This approach results in a more expensive transponder and renders the calibration of the transit chain more difficult.

BRIEF SUMMARY OF THE INVENTION

A method and apparatus are provided that calibrate a wideband radio communications system without causing significant interference with simultaneous users of the system. In one embodiment, the invention includes an antenna array adapted to transmit and receive radio communications signals with a plurality of other terminals the communications signals each using a particular minimum bandwidth. A transmit chain transmits a calibration signal through the antenna array to a transponder, and a receive chain receives through the antenna array a transponder signal from the transponder, the transponder signal being based on the calibration signal and having a bandwidth narrower than the minimum bandwidth. A signal processor measures characteristics of the transponder signal as received through the receive chain. These can be used to determine spatial signatures and to calibrate the transmit chain and the receive chain.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

Figure 1:
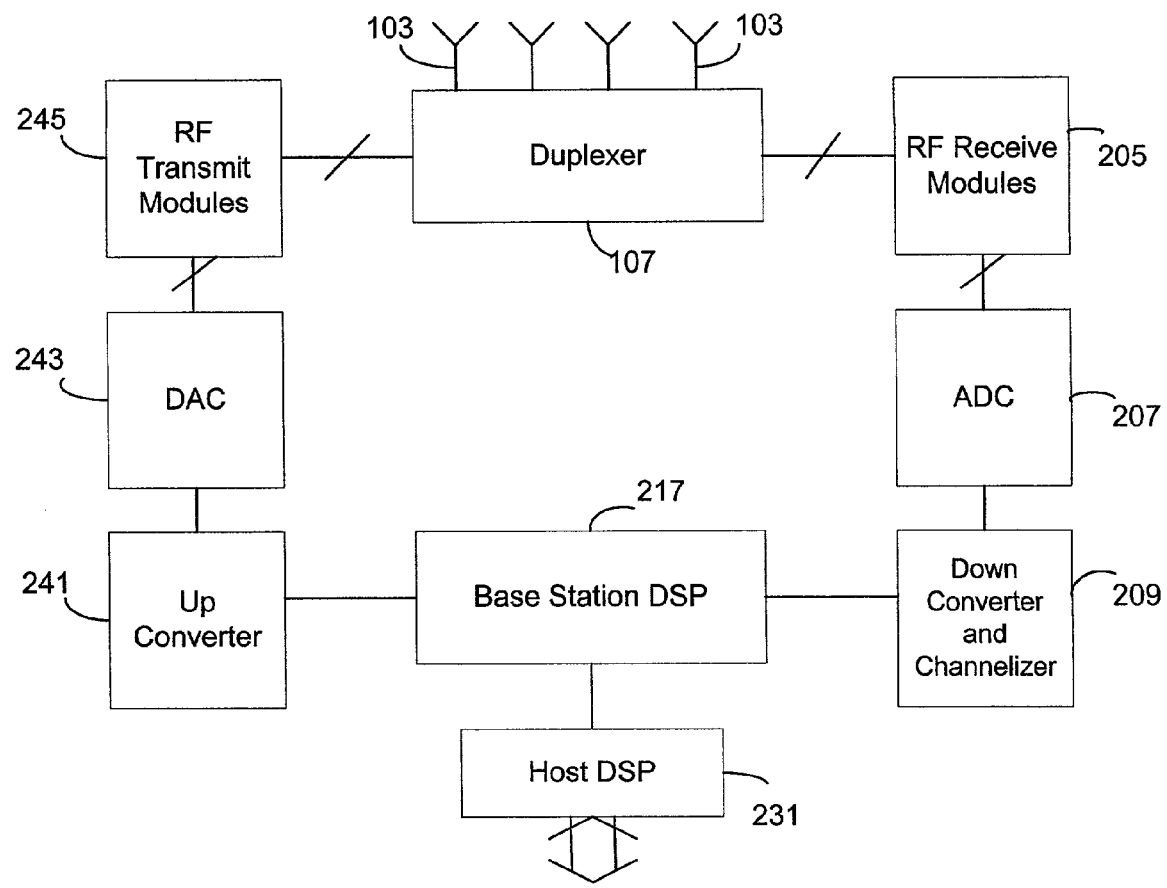
FIG. 1 is a block diagram illustrating an exemplary architecture of a wireless communication system base station appropriate for use with one embodiment of the present invention.

In one embodiment, the present invention includes a method for calibrating the transmit and receive chains of a wideband adaptive antenna base station using a narrowband transponder. In order to calibrate the transmit and the receive chains, the base station transmits a different narrowband calibration signal over each of the transmit chains in the downlink frequency band. These signals are then received by the narrowband transponder and retransmitted to the base station as narrowband signals in the wideband uplink frequency band. In this application, the radios in the adaptive antenna base station support wideband channels. However, in order to avoid creating any unnecessary interference, the calibration signals and the transponder signals are narrowband. In other words, the calibration signals occupy only a narrow portion of the wideband channel. The transponder only receives in this narrow frequency band and only retransmits the signals in a correspondingly narrow portion of the uplink band.

Since the narrowband signals add only a small amount of energy to the wideband uplink and downlink channels, the calibration can be done while regular data traffic is being supported by the base station. The narrower the bandwidth of the calibration signals, the less will be the amount of energy that will be added to the system. For wideband spread spectrum systems the narrowband signals can easily be one tenth, or one hundredth as wide as the regular data traffic channels. For frequency division systems, the narrowband signals can still be one third to one fifth the width of the traffic channels. Proper selection of the signal power levels can further reduce the impact on regular traffic. Using multiple narrowband signals and transponder bands it is possible to calibrate for more general phase and gain variations as a function of frequency. In a CDMA (Code Division Multiple Access) system, it is possible to design the CDMA system to be particularly insensitive to narrowband signals.

In one embodiment, the transponder only receives and retransmits a narrowband within the band of the wider band system to be calibrated. The system can have a set of wideband transmitters with antenna elements and a set of wideband receivers with antenna elements or a single set of elements can be common to the transmitters and the receivers. In both cases, system performance is normally improved with frequent calibration of the relative phase and amplitude. The phase and the amplitude calibration vectors can be different for the receive chain and the transmit chain. In one example, the system has a multi-channel base station that communicates with multiple subscribers up to 10 km away using CDMA with SDMA (spatial division multiple access). For this system, it has been found that calibrations every hour or two will noticeably improve performance. With such frequent calibrations, the impact of calibration on normal operations can be important. According to the present invention, the impact of calibration on normal operations can be minimized with a narrowband calibration transponder.

On each narrow frequency calibration band, different signals can be transmitted through two or more transmit chains. The signals can be differentiated, for example, by modulating different sequences onto the signals. In one embodiment, the sequences are orthogonal sequences to aid in demodulation. In another embodiment, the sequences are modulated onto the signals as spreading codes. This allows despreading codes to be used on the received signal so that the signal from each transmit chain can be distinguished. The transponder receives these signals and re-transmits them in the base station uplink band. The signals received by the base station can then be processed in order to measure any desired relative characteristics of the signals. For example, the signals can be used to find the relative phase and amplitude of the involved transmit chains and the relative phase and amplitude of all the receive chains. By transmitting different signals over the different transmit chains, the signals can be differentiated when received. This allows characteristics such as relative phase and amplitude to be estimated separately for each transmit chain.

The relative phase and amplitude of the transmit chains can be estimated by receiving the different signals at a single antenna and then estimating the channel for each of the different signals transmitted over the different transmit chains. The relative phase and amplitude of the receive chains can be estimated by transmitting a single calibration signal over a single transmit chain and receiving it over the different receive chains. The channel received over each receive chain can then be estimated and compared to find spatial signatures and for calibration. As a result, if the calibration signal is sent once over all transmit chains and then the corresponding transponder signal is received through all receive chains, the entire array can be calibrated based on a single downlink and uplink burst. Since the transmit and receive calibration vector determinations need not be coupled to each other, performing both calibrations on the same burst increases efficiency and reduces the effects on traffic. This is the approach of U.S. Pat. No. 5,546,090 to Roy III et al. mentioned above.

As an alternative, just a few or even two of the transmit or receive chains can be calibrated at one time. If all the transmit or receive chains are not involved in each calibration measurement, then repeated calibration measurements with different sets of transmit or receive chains can be performed so that all relative phases and amplitudes can be measured among all the transmit and receive antennas. Accuracy is improved if there is a common transmit or receive chain in each of the measurements. This allows the measured phases and amplitudes to be related to each other with reference to the common chain. Typically, one of the receive chains is designated as a reference receive chain and calibration signals are measured in pairs with each receive chain being paired with the reference chain. Since the reference chain participates in every measurement, all of the other chains can be referenced to each other through the reference chain. After the receive chains are calibrated, a similar process is performed with the transmit chains being measured in pairs against the reference. It is not important which particular chain is selected to be the reference and the receive and transmit references need not have any relationship to each other.

In one embodiment, the present invention is implemented in an SDMA radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Extended Kahnan filters or other types of linear filters, well known in the art, can be used to exploit the properties of the training sequences in determining spatial parameters. Further details regarding the use of spatial division and SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

Base Station Structure

The present invention relates to wireless communication systems and may be a fixed-access or mobile-access wireless network. It may use spatial division technology in combination with wideband multiple access systems, such as code division multiple access (CDMA), and other spread spectrum type systems. FIG. 1 shows an example of a base station of a wireless communications system or network suitable for implementing the present invention. The system or network includes a number of subscriber stations, also referred to as remote terminals or user terminals, (not shown). The base station may be connected to a wide area network (WAN) through its host DSP 231 for providing any required data services and connections external to the immediate wireless system. To support spatial division, a plurality of antennas 103 is used, for example four antennas, although other numbers of antennas may be selected.

The outputs of the antennas are connected to a duplexer switch 107, which in this CDMA system is a frequency switch. Alternatively, separate transmit and receive antenna arrays can be used, in which case the duplexer is not necessary. When receiving, the antenna outputs are connected via the switch 107 to RF (radio frequency) receive modules 205, and are mixed down and channelized in a down converter 207. The down converted signals are then sampled and converted to digital in an ADC (analog to digital converter) 209. This can be done using FIR (finite impulse response) filtering techniques. The invention can be adapted to suit a wide variety of RF and IF (intermediate frequency) carrier frequencies and bands.

There are, in the present example, four antenna channel outputs, one from each antenna receive module 205. The particular number of channels can be varied to suit network needs. For each of the four receive antenna channels, the four down-converted outputs from the four antennas are fed to a digital signal processor (DSP) device 217 for further processing, including calibration. According to one aspect of this invention, four Motorola DSP56300 Family DSPs can be used as channel processors, one per receive channel. The timeslot processors 217 monitor the received signal power and estimate the phase and time alignment. They also determine smart antenna weights for each antenna element. These are used in the spatial division multiple access scheme to determine a signal from a particular remote user and to demodulate the determined signal.

The output of the channel processors 217 is demodulated burst data. This data is sent to the host DSP 231 whose main function is to control all elements of the system and interface with the higher level processing. The higher level processing provides the signals required for communications in all the different control and service communication channels defined in the system's communication protocols. The host DSP 231 can be a Motorola DSP56300 Family DSP. In addition, channel processors send the determined receive weights for each user terminal to the host DSP 231.

The host DSP 231 maintains state and timing information, receives uplink burst data from the channel processors 217, and programs the channel processors 217. In addition, it decrypts, descrambles, checks error detecting code, and deconstructs bursts of the uplink signals, then formats the uplink signals to be sent for higher level processing in other parts of the base station. With respect to the other parts of the base station, it formats service data and traffic data for further higher processing in the base station, receives downlink messages and traffic data from the other parts of the base station, processes the downlink bursts and formats and sends the downlink bursts to the transmit chain, discussed below.

Transmit data from the host DSP 231 is used to produce analog transmit outputs which are sent to the RF transmitter (tx) modules 245. Specifically, the received data bits are converted via a DAC (digital to analog converter) 241 to analog transmit waveforms and up-converted into a complex modulated signal, at an IF frequency in an upconverter 243. The analog waveforms are sent to the transmit modules 245. The transmit modules 245 up-convert the signals to the transmission frequency and amplify the signals. The amplified transmission signal outputs are sent to antennas 103 via the duplexer/time switch 107.

Narrowband Transponder Structure

Figure 2:
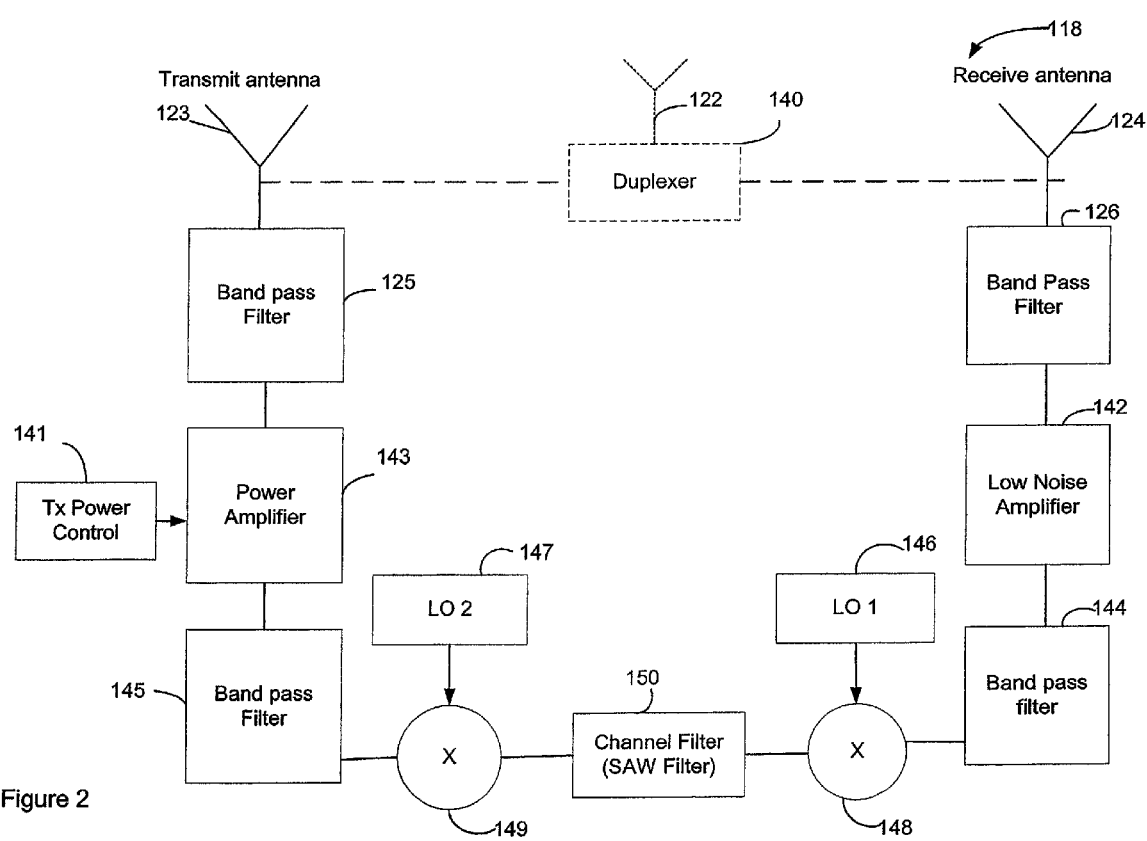
FIG. 2 is a block diagram illustrating an exemplary architecture of a wireless transponder system appropriate for use with the base station of FIG. 1.

Referring to FIG. 2, an example of a remote transponder, suitable for use in implementing the present invention is shown. This transponder is designed to be inexpensive and simple. The particular transponder design shown can also be made in a small, portable, and lightweight package that can be used at the installation of the base station, if desired. The transponder can be mounted on a nearby fixture or even on the antenna mast that is used by the base station's antennas. Alternatively, the transponder can instead be operated as a special mode of a much more complex and fully functional user terminal. A second base station can also perform the transponder functions. The function of the transponder 118 is to receive a signal in the range of the wideband downlink channel, up-convert or down-convert it to the wideband uplink channel, filter it to select only a narrow frequency band, amplify it, and then re-transmit it as a signal in the range of the uplink channel. As mentioned above, frequency-shifting transponder 118 is only one possible example of a transponder suitable for use in calibration. The only general requirement for the transponder is that it transmit back a radio frequency signal that is somehow distinguishable from the signal it received. Besides frequency shifting the signal, the transponder can also time delay the signal, or more generally modulate it with various well-known modulation schemes. For a code division multiplex system, the transponder can also decode the received signal and encode it with a new spreading code for the uplink channel.

As shown in FIG. 2, the calibration signal from the base station is received at the transponder antenna 122. A duplexer 140 separately routes signals received at the antenna to the receive chain beginning with a receive bandpass filter 126 and signals coming from the transmit chain, ending with a transmit bandpass filter 125. In the receive chain, signals coming from the transponder antenna after filtering 125 are routed to a low noise amplifier (LNA) 142. This amplified signal is then filtered again by a bandpass filter 144, which eliminates unwanted signals based on their frequencies. This filtered signal is then down-converted to IF (intermediate frequency) by a mixer 148 that combines the received signal with a LO (local oscillator signal) 146 waveform. The IF signal is processed through another bandpass filter 150 before upconversion for transmission.

A second mixer 149 combines the signals from the bandpass filter 150 and a second LO 147 to produce two new transmit signals at frequencies spaced apart from each other and within the uplink frequency band. These two new signals are bandpass filtered 145 and amplified in a power amplifier 143. The power amplifier is adjusted by a power feedback control loop 141 to reduce interference with other channels and smoothe reception of the calibration signal at the base station. Another bandpass filter 125 eliminates the upper mixer product and any artifacts from the power amplifier, leaving only the lower mixer product which is a copy of the original input signal on the RF receive chain except for its frequency. This signal is connected to the duplexer 140 for transmission through the antenna element 122. The transponder shows, as an alternative, a separate transmit antenna element 123 and receive antenna element 124. If separate elements are used then the duplexer 140 is no longer required and the antennas can be directly coupled to the respective transmit and receive bandpass filters.

The transponder described above is designed to shift and transpond narrowband signals from the base station that are transmitted in the band for North American cellular CDMA communications, designated as IS-95 by the Telecommunications Industry Association (TIA). In some circumstances, it might be desirable to receive a wideband calibration signal over the complete CDMA channel and return it as a narrowband signal. Since most single channel communication bandwidths are too wide for practical filters at RF frequencies, such a single channel transponder would mix the RF frequency down to a lower intermediate frequency, apply a narrowband filter at this intermediate frequency, and then mix the filtered signal back up to the desired RF frequency to be echoed back as a narrowband signal. In all other aspects, the wideband, single channel, transponder would behave and be constructed like the narrowband transponder described here.

In operation, the base station DSP 217 generates a specialized narrowband calibration transmit signal which it transmits from the antenna array through the duplexer. The transponder receives the calibration transmit signal and echoes it back with the appropriate changes so that it will be received through the receive chain through the duplexer. In a conventional cellular CDMA system, the radio system uses different frequencies for transmit and receive. Thus, the transponder echoes back a signal on the uplink frequency band that is a frequency-shifted copy of the downlink signal it receives. The base station DSP acquires the echoed calibration signal through the receive chain and uses this received calibration signal along with knowledge of the transmit calibration signal to calculate array calibration vectors which are then stored in a calibration vector storage buffer.

For a CDMA cellular system, the system may be allocated a bandwidth from, e.g., 824 MHz to 835 MHz or from 835 MHz to 849 MHz. The wideband channels within this range may be as narrow as 1.25 MHz or as wide as 5 MHz. In such a system, uplink and downlink frequency bands are typically separated from each other with a significant guard band so that they are separated by 1.25 MHz to 5 MHz. This is the amount by which the transponder must shift the calibration signal frequency to send it back to the base station. In other systems, the wideband uplink and downlink channels may be as wide as 40 MHz or more. The narrowband calibration signals on the other hand, would typically be from 0.01 MHz to 0.1 MHz wide. The spectral width of the calibration signal will be as small as reasonably convenient with readily available equipment at moderate cost. The narrower the signal, the less it will interfere with existing traffic. However, as mentioned above, the narrowband signal must also be able to be transmitted and received by the wideband transmit and receive chains. The necessary bandwidth limitations will also depend on the particular system. For a system in which the wideband signals are 1.25 MHz wide, the narrowband signals will probably be much narrower than for a system in which the wideband signals are 40 MHz wide. The particular carrier frequencies used can also be adapted to suit the needs of the particular system. Currently, appropriate systems have carrier frequencies centered at frequencies ranging from 450 MHz to 2100 MHz. This range is expected to become greater as radio technologies and spectrum allocations change.

Calculation of Calibration Vectors

There are a variety of different ways to calibrate a multiple antenna array using narrowband signals and a transponder. U.S. Pat. No. 5,546,090 issued Aug. 13, 1996 to Roy, III et al., U.S. Pat. No. 5,930,243 issued Jul. 27, 1999 to Parish et al. and U.S. Pat. No. 6,037,898 issued to Parish et al. show approaches to calibration suitable for use in the present application. Another approach is shown in International Application No. WO99157820, published Nov. 11, 1999 of Boros et al. The disclosures of these references are hereby incorporated by reference herein.

A single transponder or subscriber unit can be used together with its base station to calibrate the base station. However, the present invention enables the separate determination of the uplink and downlink signatures for the transponder or any subscriber unit. These spatial signatures include the effects of the electronic signal paths in the base station hardware and any differences between the uplink and downlink electronic signal paths for the transponder or subscriber unit. One use of such information is to determine separate calibrations for each subscriber unit when the RF propagation to and from the subscriber unit is different. Another use is for calibrating the base station, but rather than obtaining a single calibration vector using the base station and a single transponder, using several transponders to determine the single calibration vector. In one embodiment, the single calibration vector is the average calibration vector. In another embodiment, it is the weighted average calibration vector. The weighting given to the estimate made using a particular subscriber unit will depend on a measure of the quality of the signal received by that subscriber unit, so that estimates from subscriber units having better quality signals are weighed more in the weighted average. A method and apparatus for determining signal quality is disclosed in International Application No. WO99/40689, published Aug. 12, 1999 of Yun.

In the architecture of FIGS. 1 and 2, the base station DSP generates a set of signals that are used for calibration. In one example, all antennas transmit different known calibration signals so that the channel from each transmit antenna to each receive antenna can be calculated. Generally, after subtracting out the components specific to the transponder's location, a receive calibration vector can then be estimated from the difference in phase and amplitude of the channels from one transmit antenna to each receive antenna. By averaging the results from all the transmit antennas, the calibration vector can be improved still further. Correspondingly, a calibration vector of the transmit chains can be estimated, after subtracting out the transponder specific components, from the relative phases and amplitudes of the channels from different transmit antennas to one of the receive antennas. Again, averaging the results from all the different receive antennas can improve the estimate. Specific details of how to perform a calibration and determine a calibration vector will be understood by one of average skill in the art especially in light of the examples of the patents mentioned above.

Method of Operation

Figure 3:
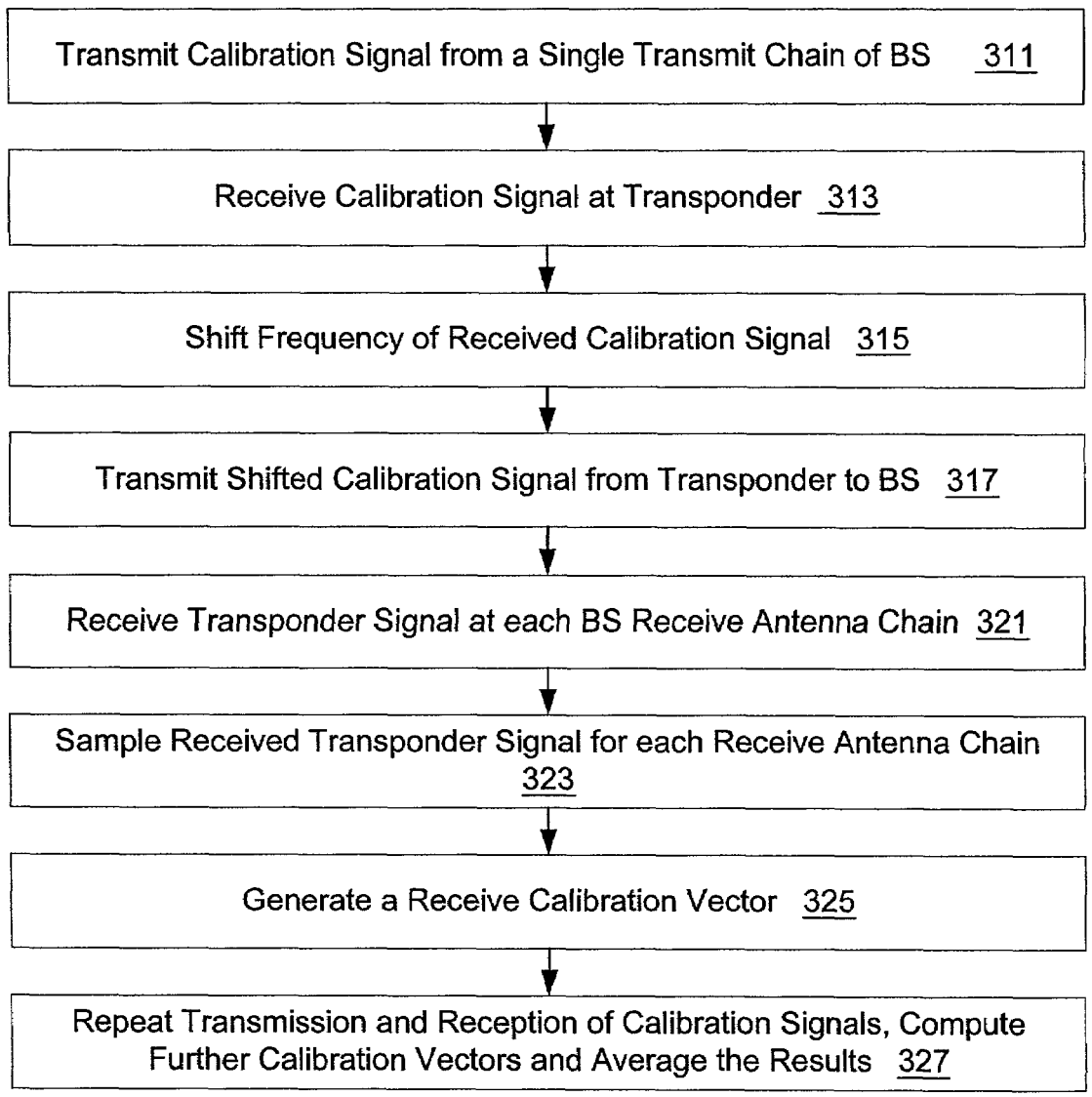
FIG. 3 is a process flow diagram showing the calibration of a receive chain.

An example of an operational process for calibrating a group of receive chains is shown in FIG. 3. The calibration process typically includes calibrating the receive chain and the transmit chain with the same set of samples. To begin a calibration cycle, for the receive chain the base station (BS) (see e.g. FIG. 1) will generate a calibration signal. As discussed above, this is typically a narrowband signal. This narrowband transmit calibration signal is then transmitted from a single transmit chain of the base station 311. The transmission can occur at any time during the regular use of the base station for normal operation due to the small amount of additional energy added to the existing wideband data traffic by the narrowband signal. While only one transmit chain is required, transmitting from all of the transmit chains at once provides more samples for the receive calibration algorithms.

The transmitted narrowband calibration signal is received at the transponder 313, (see e.g. FIG. 2). If the calibration signal is a wideband signal, it is converted to a narrowband signal using appropriate bandpass filters as discussed above. If the signal has a particular spreading sequence or is modulated with a particular data or training sequence, this can be demodulated and a new signal can be modulated onto the signal. In one embodiment, the calibration signal is a narrrowband signal, which is simply received, shifted in frequency 315, and transmitted back to the base station 317. This approach simplifies the transponder and eliminates many other potential causes of errors. The frequency shifted calibration signal can also be shifted to two or more different frequencies and retransmitted so that calibration can be performed across different narrow frequency bands. However, the same effect can be achieved with a simpler transponder by sending several different calibration signals from the base station, each at a different frequency for the downlink. Each signal will be shifted to a different frequency for the uplink.

The base station receives the transponder signal or signals at each of its receive antenna chains 319. These received transponder signals are sampled for each receive antenna chain 321 and the samples can be used to measure any number of characteristics of the received signal. Calibration can be performed using any of the algorithms known in the art based on these samples. Each set of samples from each receive chain represents a different view of the same narrowband transponder signal. To enhance reception, the DSP 217 will typically use a narrow bandpass filter to eliminate most of the data traffic signal energy and isolate the received transponder signal. The calibration will typically be based on comparing the received transponder signal as it was received by each receive chain to each signal as received by each other receive chain 323. This is commonly done by measuring phases and amplitudes and using a covariance matrix, for example. As an alternative, the signal can be sampled at only two receive chains. This will allow the two selected chains to be calibrated against each other. By repeating the process for each possible combination or for each receive chain against a receive chain selected to be the reference, the same calibration results can be obtained.

Once the comparisons are done and the differences in phase and amplitude between the different receive chains have been determined, a receive calibration vector can be generated 325. Typically this is a set of factors to be applied to each receive chain in order to compensate the differences. When the calibrations are done against a reference chain, pairing each receive chain against the reference, the reference chain's vectors can be set at one, or some other normalized set of values, so that the vectors for the other receive chains represent the variance from the reference chain. The process described above can then be repeated and the results averaged 327. Alternatively, the resulting vector can be applied and the process repeated to find a new vector that is used to adjust the first vector. By applying the adjusted calibration vector after each cycle, the calibration should become progressively more accurate until it converges on the limit of the calibration system's accuracy. The transmission, reception and computations can be repeated at different frequencies as well as for different combinations of receive chains and even for different transponders. Over time, the characteristics of the receive chain can also change and so the process can also be repeated in order to update the calibration vectors with changing conditions.

Figure 4:
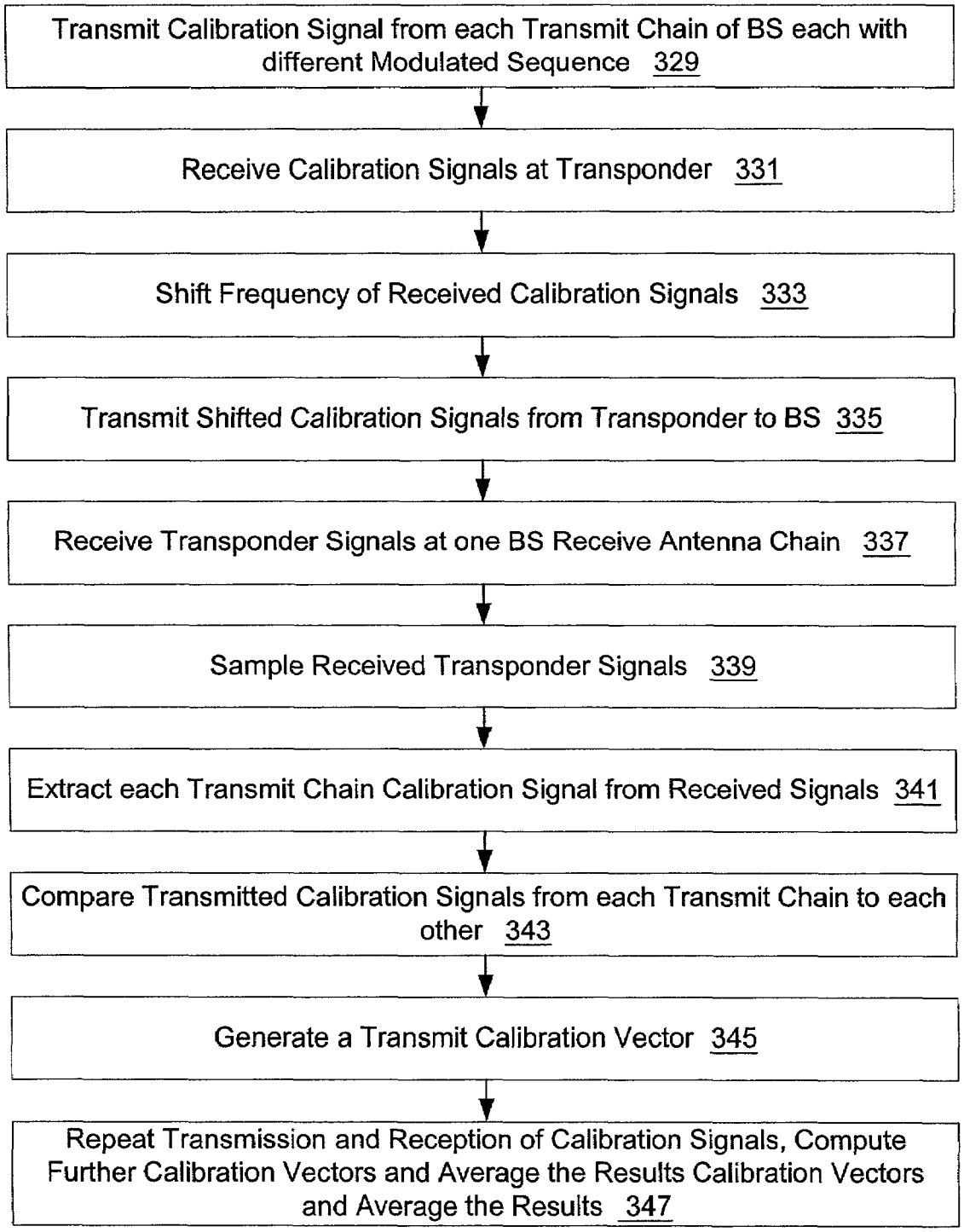
FIG. 4 is a process flow diagram showing the calibration of a transmit chain.

Calibration of the transmit chain is done in a similar way as shown in FIG. 4. As with the receive chain, a calibration signal is transmitted to the transponder. In this case, the calibration signal is transmitted from each of the base station's transmit chains 329. So that they can be distinguished from each other when received, each receive chain uses a different modulation sequence. As an alternative, each could use a different spreading code. As with the receive calibration, this signal can be wideband or narrowband. The narrowband signal allows the transponder to have a simpler construction.

The calibration signals are received at the transponder 331. Which then, as with the receive calibration, shifts the frequency of the received calibration signals 333. After that, the shifted calibration signals are transmitted back to the base station 335. It is again possible to change modulated sequences or spreading codes but the simplest transponder will take the narrowband signal that it receives in the downlink band and transmit it back as a virtually identical narrowband signal in the uplink band.

The base station receives the transponder signals this time at just one receive antenna chain 337. The received transponder signals are sampled 339 and then the unique modulated sequences are used to extract each transmit chain calibration signal 341 from the sampled waveform. As with the receive calibration, a narrow bandpass filter is typically used to isolate the transponder signal. For calibration purposes, the transmitted calibration signals from each transmit chain are compared to each other 343. In order to make it easier to distinguish the simultaneously received signals from the different transmit chains, the number of simultaneous transmit chains can be reduced. For example, one of the transmit chains can be designated as the reference and then each other transmit chain can transmit with the reference, one pair at a time, until all the transmit chains have been calibrated against the reference. This is similar to the pair-wise receive chain calibration mentioned above.

These comparisons become the basis for generating a transmit calibration vector 345. The entire process can then be repeated to refine the results or as conditions change 347. In one embodiment, the calibration vector determined in the first round is applied to each transmit chain, and then the process is repeated. The next calibration cycle will lead to greater accuracy as the gross errors have already been compensated. This is similar to performing a coarse tuning process and then a fine-tuning process.

The present invention provides many advantages over the prior art. Calibrations can be performed using only a simple, inexpensive transponder. Both transmit and receive calibration can be determined in a single transaction and the method self-corrects for reference frequency offsets in the antenna array system. Accordingly, calibration in accordance with the present invention is inherently accurate. While the invention has been described primarily as a calibration of a base station using a remote transponder, it can be applied to remote user terminals that have multiple antennas. It can also be applied to any other type of wireless network with multiple antenna system whether one with base stations and remotes, equal peers or masters and slaves.

To improve the reception of regular traffic during calibration, it may be desirable to apply a notch filter at the base station to filter out the transponder signal band. This would typically be a digital filter and can be turned off when no calibration signal is active. The subscriber units could similarly have a notch filter for the calibration signal from the base station.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits, such as a DSP programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless spread spectrum data system for mobile remote terminals, it can be applied to a wide variety of different wireless systems in which data is exchanged. Such systems include voice, video, music, broadcast and other types of data systems without external connections. The present invention can be applied to fixed user terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

The invention claimed is:

1. A radio communications system comprising:
   an antenna array adapted to transmit and receive radio communications signals with a plurality of other terminals the communications signals each using a particular minimum bandwidth;
   a transmit chain to transmit a calibration signal through the antenna array to a transponder;
   a receive chain to receive through the antenna array a transponder signal from the transponder, the transponder signal being based on the calibration signal and having a bandwidth narrower than the minimum bandwidth; and
   a signal processor to measure characteristics of the transponder signal as received through the receive chain.

2. The system of claim 1, wherein the calibration signal has a bandwidth narrower than the minimum bandwidth.

3. The system of claim 1, wherein the transponder signal is reduced in carrier bandwidth and converted in frequency as compared to the calibration signal.

4. The system of claim 1, wherein the measured characteristics of the transponder signal include phases and amplitudes.

5. The system of claim 4:
   wherein the receive chain comprises a plurality of receive chains;
   wherein each receive chain receives the transponder signal; and
   wherein the signal processor determines a receive calibration vector by comparing the phases and amplitudes of the transponder signal as received by each receive chain.

6. The system of claim 5, wherein the signal processor determines the receive calibration vectors by forming a vector whose complex elements have phases and amplitudes corresponding to the relative difference in phase and amplitude of the channels from each receive chain.

7. The system of claim 5, wherein each receive chain comprises a receive channel from an antenna to the conversion to a digital representation of the received signal.

8. The system of claim 5, wherein one of the plurality of receive chains is selected as a reference chain and the complex elements of phase and amplitude of the receive calibration vector for the reference chain are set equal to one.

9. The system of claim 5, wherein the receive calibration vector is formed by averaging several receive calibration vectors.

10. The system of claim 5, wherein the signal processor determines a transmit calibration vector using measured phases and amplitudes of several receptions of the transponder signal.

11. The system of claim 4, wherein the signal processor determines an uplink signature of the transponder at the antenna array using the measured phases and amplitudes of the transponder signal.

12. The system of claim 1, wherein the signal processor further determines a receive calibration vector for the receive chain using the uplink signature of the transponder.

13. The system of claim 4, wherein the signal processor determines a downlink signature of the transmit chain at the transponder using the measured phases and amplitudes of the transponder signal.

14. The system of claim 13, wherein the signal processor further determines a transmit calibration vector for the transmit chain using the downlink signature of the transmit chain.

15. The system of claim 1:
   wherein the transmit chain comprises a plurality of transmit chains;
   wherein each transmit chain transmits the calibration signal; and
   wherein the signal processor determines a downlink signature of the transmit chain at the transponder by comparing the calibration signal from each transmit chain as reflected in the measured characteristics of the transponder signal.

16. The system of claim 15, wherein the calibration signal comprises a plurality of signals, one from each transmit chain, each signal being individually identifiable based on a unique spreading function.

17. The system of claim 15, wherein the calibration signal comprises a plurality of signals, one from each transmit chain, each signal being individually identifiable based on a unique modulation sequence.

18. The system of claim 15, wherein the measured characteristics of the transponder signal include phases and amplitudes and wherein the signal processor determines a transmit calibration vector by forming a vector whose complex elements have phases and amplitudes corresponding to the relative difference in phase and amplitude of the channels from each transmit chain.

19. The system of claim 18, wherein one of the plurality of transmit chains is selected as a reference chain and the complex elements of phase and amplitude of the transmit calibration vector defined with reference to the reference chain.

20. The system of claim 18, wherein the transmit calibration vector is formed by averaging several transmit calibration vectors.

21. The system of claim 1, wherein the antenna array includes a plurality of antennas each of which transmits and receives signals.

22. The system of claim 1, wherein the antenna array includes a first plurality of antennas for transmitting the calibration signal and a second plurality of antennas for receiving the transponder signal.

23. The system of claim 22:
   wherein each antenna has a corresponding transmit chain and a corresponding receive chain;
   wherein each transmit chain transmits the calibration signal;
   wherein each receive chain receives the narrowband transponder signal based on the transmitted calibration signal; and
   wherein the signal processor determines a transmit calibration vector by comparing the calibration signal from each transmit chain as reflected by the measured characteristics and determines a receive calibration vector by comparing the transponder signal received at each receive chain as reflected by the measured characteristics.

24. The system of claim 23, wherein the calibration signal is transmitted substantially simultaneously from each transmit chain.

25. The system of claim 23, wherein the receive calibration vector and the transmit calibration vector are determined based on the same transponder signal reception.

26. The system of claim 1, wherein the antenna array, receive chain and transit chains are components of a code division multiple access cellular communications system.

27. A method comprising:
   transmitting a calibration signal from an antenna array, the antenna array being adapted to transmit and receive radio communication signals each using a particular minimum bandwidth;
   receiving a transponder signal at the antenna array, the transponder signal being based on the calibration signal and having a bandwidth narrower than the minimum bandwidth; and
   measuring characteristics of the transponder signal as received through the receive chain.

28. The method of claim 27, further comprising generating a calibration vector using the measured characterstics.

29. The method of claim 27, further comprising generating a transmit calibration vector by comparing the transponder signal as received by the individual elements of the transmit antenna array using the measured characterstics.

30. The method of claim 27, wherein transmitting comprises transmitting a calibration signal having a bandwidth narrower than the minimum bandwidth using the antenna array.

31. The method of claim 27, wherein the transponder signal is frequency shifted in comparison to the calibration signal.

32. The method of claim 27, wherein the antenna a array has a plurality of antennas, wherein each antenna has a corresponding transmit chain and a corresponding receive chain, wherein transmitting comprises transmitting the calibration signal from each transmit chain, wherein receiving comprises receiving the transponder signal at each receive chain, and further comprising determining a transmit calibration vector by comparing the calibration signal from each transmit chain as received as a transponder signal by each receive chain.

33. The method of claim 32, wherein the calibration signal is transmitted substantially simultaneously from each transmit chain.

34. The method of claim 28, further comprising generating a transmit calibration vector using the measured characteristics of the transponder signal as received by individual antenna elements.

35. The method of claim 34, further comprising generating a receive calibration vector by comparing the measured characteristics of the transponder signal as received by the individual antenna elements.

36. The method of claim 27, further comprising determining a spatial signature for the transponder signal using the measured characteristics as received through the receive chain.

37. The method of claim 36, wherein the antenna array has a plurality of antennas, wherein each antenna has a corresponding transmit chain and a corresponding receive chain, wherein transmitting comprises transmitting the calibration signal from each transmit chain, wherein receiving comprises receiving the transponder signal at each receive chain, and wherein determining a spatial signature comprises determining an uplink spatial signature by comparing the transponder signal as received by each receive chain.

38. The method of claim 37, wherein determining the spatial signature comprises forming a vector whose complex elements have phases and amplitudes corresponding to the relative difference in phase and amplitude of the channels from each receive chain.

39. The method of claim 37, further comprising determining calibration vectors for the receive chain and the transmit chain using the spatial signature.

40. The method of claim 36, wherein the spatial signature is formed by averaging several spatial signatures.

41. A calibration transponder for use in a radio communications system comprising:
   a receive antenna to receive a wideband calibration signal from a system to be calibrated;
   a bandpass filter to convert the wideband calibration signal into a narrowband signal; and
   a transmit chain including a transmit antenna to transmit the narrowband signal to the system to be calibrated.

42. The transponder of claim 41, wherein the calibration signal is a spread spectrum signal, the transponder further comprising a filter to convert the spreading code of the calibration to a different spreading code.

43. The transponder of claim 41, further comprising a mixer to convert the frequency of the calibration signal to a different frequency before transmitting.

* * * * *